(12) United States Patent
Briles et al.

(10) Patent No.: US 6,766,141 B1
(45) Date of Patent: Jul. 20, 2004

(54) REMOTE DOWN-HOLE WELL TELEMETRY

(75) Inventors: Scott D. Briles, Los Alamos, NM (US); Daniel L. Neagley, Albuquerque, NM (US); Don M. Coates, Santa Fe, NM (US); Samuel M. Freund, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 26 days.

(21) Appl. No.: 10/187,025

(22) Filed: Jun. 28, 2002

Related U.S. Application Data

(63) Continuation-in-part of application No. 09/760,193, filed on Jan. 12, 2001, now Pat. No. 6,434,372.

(51) Int. Cl.[7] .............................................. H04B 13/02
(52) U.S. Cl. ........................ 455/40; 455/41.1; 455/106; 340/853.1; 340/854.8; 340/855.8
(58) Field of Search ........................ 455/40, 41.1–41.3, 455/106, 572; 340/853.1, 854.4, 854.5, 854.6, 854.8, 855.6–855.8, 856.3; 375/218

(56) References Cited

U.S. PATENT DOCUMENTS 4,739,325 A * 4/1988 MacLeod ..................... 340/854
6,434,372 B1    8/2002 Neagley et al. ............. 455/106
2002/0163441 A1 * 11/2002 Hill et al. ................. 340/855.4

* cited by examiner

Primary Examiner—Lee Nguyen
(74) Attorney, Agent, or Firm—Samuel M. Freund; Milton D. Wyrick

(57) ABSTRACT

The present invention includes an apparatus and method for telemetry communication with oil-well monitoring and recording instruments located in the vicinity of the bottom of gas or oil recovery pipes. Such instruments are currently monitored using electrical cabling that is inserted into the pipes; cabling has a short life in this environment, and requires periodic replacement with the concomitant, costly shutdown of the well. Modulated reflectance, a wireless communication method that does not require signal transmission power from the telemetry package will provide a long-lived and reliable way to monitor down-hole conditions. Normal wireless technology is not practical since batteries and capacitors have to frequently be replaced or recharged, again with the well being removed from service. RF energy generated above ground can also be received, converted and stored down-hole without the use of wires, for actuating down-hole valves, as one example. Although modulated reflectance reduces or eliminates the loss of energy at the sensor package because energy is not consumed, during the transmission process, additional stored extra energy down-hole is needed.

52 Claims, 12 Drawing Sheets

REMOTE DOWN-HOLE WELL TELEMETRY

CROSS-REFERENCE TO RELATED APPLICATIONS

This patent application is a continuation-in-part of a nonprovisional patent application Ser. No. 09/760,193 which was filed on Jan. 12, 2001 now U.S. Pat. No. 6,434,372.

STATEMENT REGARDING FEDERAL RIGHTS

This invention was made with government support under Contract No. W-7405-ENG-36 awarded by the U.S. Department of Energy to The Regents of The University of California. The government has certain rights in the invention.

FIELD OF THE INVENTION

The present invention relates generally to wireless data transmission and, more particularly, to the use of modulated-reflector technology for full-duplex, wireless communications with remote, down-hole electronics modules. The invention also relates to the wireless transmission of electrical energy for storage at remote locations

BACKGROUND OF THE INVENTION

Present day oil wells are highly sophisticated, hugely expensive operations. Modern well drilling is directionally controlled and the pipe runs can reach distances of over 25,000 feet. Platforms for off-shore wells can cost $1.5 billion apiece and must be operated at the highest levels of efficiency. Determining the down-hole conditions of a well has become a critical requirement. Conditions such as temperature, pressure, water content, salinity and others must be closely monitored. For example, as a well ages, well parameters are used to make important decisions as to how to obtain the highest yield from a particular branch of a manifold as the well's output changes composition and performance over time. Thus, telemetry from down-hole sensors has become critical to making multi-million dollar decisions.

Reliable telemetry using electrical cables is difficult in the oil-well environment since, among other problems, cables are regularly destroyed by the harsh conditions extant down hole; for example, well temperatures can be as high as 250° C., there is continuous, substantial abrasion by sand and dirt carried by flowing gases and liquids, and the actual cable insertion process can disrupt cable continuity.

A wireless method would be a significant improvement over the use of cables, but electricity to power normal transmissions from the sensors has not been practical without the use of wires since down-hole power sources such as batteries or capacitors need to be recharged.

Accordingly, it is an object of the present invention to communicate with down-hole sensing and monitoring equipment without the use of wires.

Another object of the invention is to provide energy to down-hole electrical equipment without the use of wires.

Still another object of the present invention is to significantly reduce energy consumption in the transmission of information from down-hole sensors.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the method hereof for communicating with the distal end of an electrically conducting pipe includes the steps of: generating a radio frequency signal having a chosen frequency at the proximal end of the electrically conducting pipe such that the electrically conducting pipe radiates the signal at least in the vicinity of the distal end thereof; reflecting the radiated radio frequency signal in the vicinity of the distal end of the electrically conducting pipe such that the reflected radio frequency signal is received by the conducting pipe and transmitted to the proximal end thereof; modulating the reflected radio frequency signal in response to data received from the vicinity of the distal end of the electrically conducting pipe; and detecting the modulated, reflected signal at the proximal end of the electrically conducting pipe.

In another aspect of the present invention and in accordance with its objects and purposes the method for communicating with the distal end of an electrically conducting pipe hereof includes the steps of: generating a radio frequency signal having a chosen frequency at the proximal end of the electrically conducting pipe such that the signal remains within the electrically conducting pipe and is transmitted thereby to the distal end thereof whereafter the radio frequency signal exits the electrically conducting pipe; reflecting the radio frequency signal exiting the distal end of the electrically conducting pipe such that the reflected signal reenters the electrically conducting pipe, remains therein and is transmitted to the proximal end thereof; modulating the reflected radio frequency signal in response to data received in the vicinity of the distal end of the electrically conducting pipe; and detecting the modulated, reflected signal at the proximal end of the electrically conducting pipe.

In yet another aspect of the present invention and in accordance with its objects and purposes the method for communicating with the distal end of an electrically conducting pipe buried in the ground hereof includes the steps of: generating an electrical signal having a chosen ultra-low or extremely low frequency in the ground in the vicinity of the proximal end of the electrically conducting pipe such that the signal penetrates the ground at least to the vicinity of the buried distal end thereof; receiving the signal using the electrically conducting pipe as an antenna; modulating the impedance of the electrically conducting pipe in response to data received in the vicinity of the distal end of the electrically conducting pipe, whereby the signal received by the electrically conducting pipe is modulated; and detecting the modulated, received signal at the proximal end of the electrically conducting pipe.

In still another aspect of the present invention and in accordance with its objects and purposes the method for providing electrical energy to the distal end of an electrically conducting pipe includes the steps of: generating a radio frequency signal having a chosen frequency at the proximal end of the electrically conducting pipe such that the electrically conducting pipe radiates the signal at least in the vicinity of the distal end thereof; receiving the radio frequency signal in the vicinity of the distal end of the electrically conducting pipe; converting the radio frequency signal into dc electrical current; and storing the electrical current converted in the vicinity of the distal end of the electrically conducting pipe.

In a further aspect of the present invention and in accordance with its objects and purposes the method for providing electrical energy to the distal end of an electrically conducting pipe hereof includes the steps of: generating a radio frequency signal having a chosen frequency at the proximal end of the electrically conducting pipe such that the signal remains within the electrically conducting pipe and is conducted thereby to the distal end thereof whereafter the radio frequency signal exits the electrically conducting pipe; receiving the radio frequency signal exiting the distal end of the electrically conducting pipe; converting the received radio frequency signal into dc electrical current; and storing the electrical current in the vicinity of the distal end of the electrically conducting pipe.

In still another aspect of the present invention and in accordance with its objects and purposes the method for providing electrical energy to the distal end of an electrically conducting pipe buried in the ground hereof, includes the steps of: generating an electrical signal having a chosen ultra-low or extremely low frequency in the ground in the vicinity of the proximal end of the electrically conducting pipe such that the signal penetrates the ground to the vicinity of the buried distal end thereof; receiving the electrical signal in the vicinity of the buried distal end of the electrically conducting pipe; converting the received electrical signal into dc electric current; and storing the electrical current in the vicinity of the distal end of the electrically conducting pipe.

Benefits and advantages of the present invention include the communication with and the supply of electrical energy to down hole electronics modules without the use of wires.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 1a is a schematic representation of an embodiment of the present invention wherein the pipe is used as the antenna for the carrier wave and for the modulated return signal, and the electronics package for module to be communicated with is located at a distance from the distal end of the pipe, while

FIG. 2a is a schematic representation of a second embodiment of the present invention where the pipe is used as a waveguide for both the carrier wave and the modulated reflected signal, while

FIG. 2c shows the $TE_{11}$ mode in a circular waveguide, while

FIG. 3a is a schematic representation of a non-modulated reflectance embodiment of the present invention wherein an ultra-low frequency or extremely low frequency signal is generated using an antenna located on the surface and the combined down-hole instrument module and pipe cooperate as a receiving antenna, the instrument module modulating the characteristic impedance of the antenna in response to a chosen parameter being monitored, such that a modulated signal is received on the surface in the vicinity of the proximal end of the pipe, while

FIGS. 4a–4c show three apparatus for coupling electrical energy into and out of the end of the pipe powered as illustrated in FIG. 1 hereof, FIG. 4a illustrating a conducting coil for performing this function, while FIGS. 4c and 4d illustrate an exterior and interior conducting sleeve, respectively for achieving this result.

DETAILED DESCRIPTION

Figure 1A:
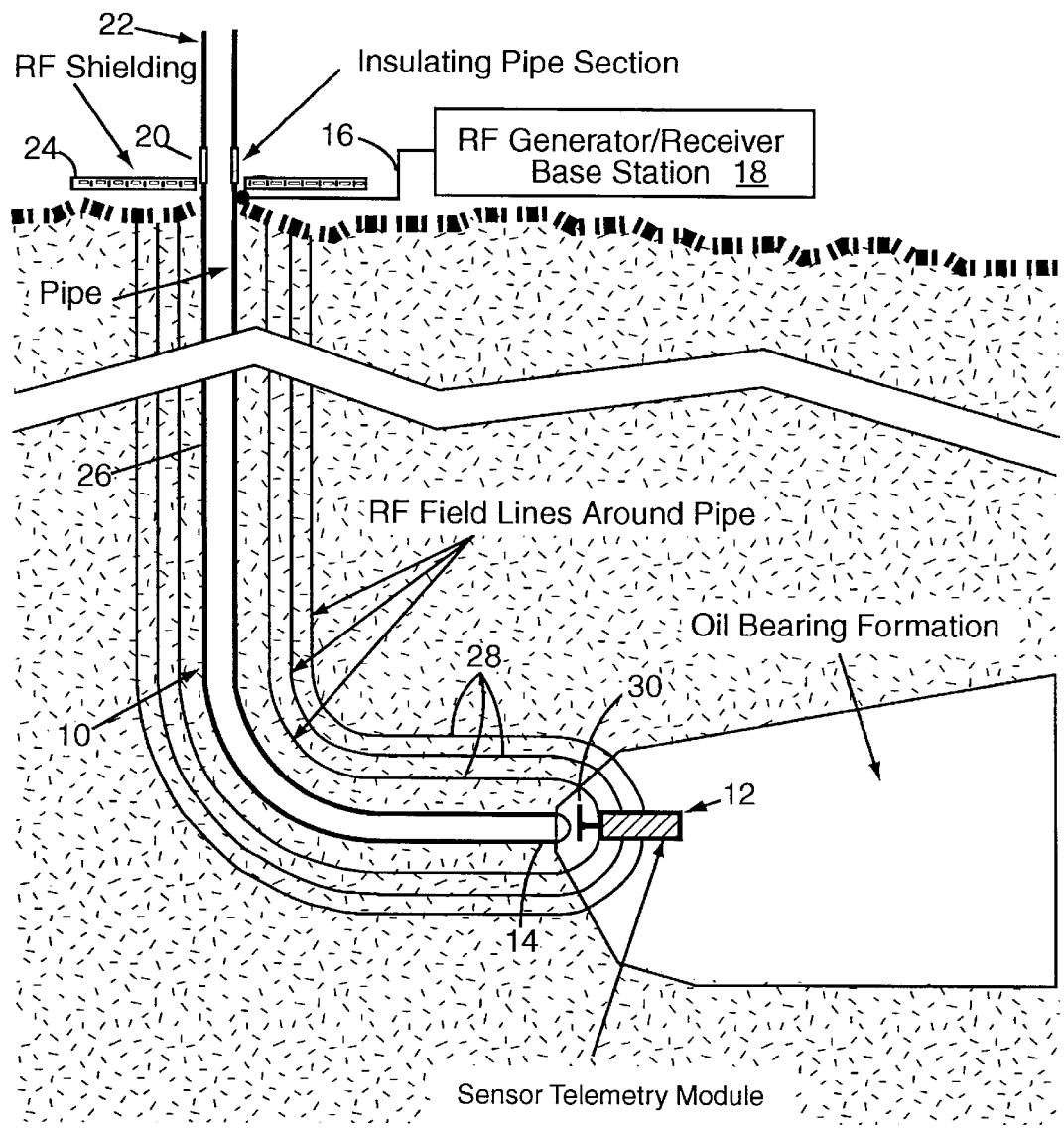

Briefly, the present invention includes an apparatus and method for wireless communication with electronics packages or modules located on the surface or buried in the earth on contact with or in the vicinity of electrically conducting pipes. This may be accomplished using modulated-reflectance technology or by transmitting a radio frequency carrier wave to the electronics package and detecting a modulated signal therefrom which is not reflected. Additionally, the invention includes an apparatus and method for wireless transmission of electrical energy downhole to remote electronics modules.

Modulated reflectance is described in detail in the parent patent application (Ser. No. 09/760,193 for "Long-Range, Full-Duplex Modulated-Reflector Apparatus For Voice/Data Transmission"), to the present patent application, the teachings of which are hereby incorporated by reference herein. In broadest terms, this technology includes:

1. A surface antenna first transmits a wireless carrier-wave frequency to the remote telemetry package, which includes an antenna tuned to the carrier frequency, and may include sensors;

2. The remote telemetry module modulates and reflects a small fraction of the inbound carrier frequency to the surface antenna in response to signals received by the sensors; the process of modulating and reflecting requires little power consumption from the remote telemetry package, unlike normal transmission systems; and 3. The surface antenna receives the modulated/reflected signal and decodes it, thereby reading the information from the telemetry sensors.

Antenna selection will derive principally from those geometries and sizes that can be placed down hole by insertion through the pipe or attached thereto during the pipe placement process. Generally, larger area antennas are preferred. Modulation for modulated-reflectance communications is next briefly discussed. There are two parameters that can be adjusted by varying the impedance of the load matched to the antenna. The first parameter is amplitude. The reflected amplitude value will be zero when the load impedance is matched to that of the antenna. Theoretically, this matched load should result in zero energy being reflected and all energy being absorbed. Slight variations from the matched-load impedance causes reflection and absorption. As the deviation of the load impedance from the matched-load impedance increases an increasing quantity of energy is reflected and a decreasing amount absorbed. At the two extremes of variation from the load impedance is zero impedance (a short circuit), and infinite impedance (open circuit).

These two extremes provide the procedure for varying the second parameter: phase. At the two antenna load extremes, short and open, the manner in which energy is reflected from the antenna is different. Both a load and a short reflect back all the energy that was received by the antenna. However, a short will invert the amplitude, or change the phase of the reflected signal by 180 degrees. Infinite antenna load impedance will not invert the amplitude of the signal. Thus, the two load extremes reflect all the energy and can be used for an efficient modulation scheme.

If the impedance of the antenna load is varied between a short and an open circuit in a periodic manner using a square wave form, then a Frequency Shift Keying (FSK) modulation scheme can be employed. If the frequency of the square wave is much less than the carrier frequency illuminating the antenna then side bands that surround the carrier frequency are generated in the reflected signal. The placement of these side bands spectrally is determined by the frequency of the square wave by which the impedance is being varied between a short and an open. Difference square wave frequencies $(f_C-f_Q)$, $(f_C-2f_Q)$, etc., where $f_C$ is the carrier frequency and $f_Q$ is the frequency of the square wave, can be used to convey different symbols. In the binary alphabet case the symbols would be a "1" and a "0". Of course m-ary signaling can be implemented where there exist m symbols in the alphabet.

FSK modulation can be implemented with square waves modulation of the antenna load to reflect the maximum amount of energy. However, square-wave modulation results in several side band frequencies that increase the bandwidth of the reflected signal. In order to reduce the bandwidth it is preferable to modulate the antenna load impedance with a sinusoidal waveform $(f_Q)$ instead of a square wave. This sinusoidal modulation can be accomplished by realizing that a zero value of the sinusoid corresponds to a matched load condition for the antenna in which none of the energy is reflected. Using quantized loads, various levels of impedance matching can be switched in sequence to create a quantized sinusoidal function. This quantized sinusoidal function modulates the impedance of the load matched to the antenna such that the extremes of the load conditions of the function are zero impedance and infinite impedance. Again, the frequency of the sinusoidal waveform must be less than that of the carrier frequency, but still be able to cause reflected energy to be modulated within the bandwidth of the antenna.

The resulting energy spectrum for this sinusoidal modulation function has single frequency sidebands on either side of the carrier frequency $((f_C-f_Q)$ and $(f_C+f_Q))$, the carrier frequency $(f_C)$ being absent. With FSK modulation, the bandwidth needed would only encompass the two side band frequencies that are associated with difference symbols. The true bandwidth needed is also dependant on the rate at which symbols are conveyed. However it is expected that the data rate would be sufficiently low that it would not require a bandwidth much larger than that bounded by the frequencies associated with the FSK modulation.

Having generally described the invention, the following examples provide additional details.

EXAMPLE 1

Pipe Serves as the Antenna

Reference will now be made in detail to the present preferred embodiments of the present invention which are illustrated in the accompanying drawings. Similar or identical structure will be identified using identical callouts. Throughout, RF or radio frequency is defined to mean electromagnetic radiation between 3 Hz and 30 GHz. Additionally, proximal end means a location along the pipe at or in the vicinity of the generation of the carrier wave and distal end refers to a location further along the pipe away from the distal end. For a vertically buried pipe, the distal end is down hole while proximal end is at or near the surface. Turning now to the Figures, FIG. 1a is a schematic representation of an embodiment of the present invention where pipe, 10, is used as the antenna for carrier wave transmission and the modulated return signal. Electronics module, 12, to be communicated with is located at a distance from the distal end, 14, of pipe 10.

Typically, pipe casings are constructed of high-strength steel alloy, and can serve as both the transmitter antenna for the carrier wave and as a receiver for the reflected/modulated signal from the sensor module. Pipe 10 is placed in electrical communication, 16, with a RF generator/receiver, 18, disposed in the vicinity of the surface where pipe 10 is buried. An RF insulating section of pipe, 20, is placed in pipeline, 22, and RF shielding, 24, is placed along the ground in order to reduce the quantity of RF radiation emitted out of the ground. In situations where the pipe is experiencing signal attenuation, such as when the pipe is buried in wet ground, a non-conductive coating, 26, on its exterior will reduce signal loss. Shown in FIG. 1a are RF field lines, 28, which illustrate the radiation of the transmitter signal from pipe 10. Electronics module 12 is shown to have a reflecting antenna, 30, for receiving the radiated carrier signal, 28, and for reflecting the signal in a modulated manner responsive to the measurements performed by module 12 which are to be transmitted to the surface. The reflected, modulated signal is received by pipe 10 which functions as a receiving antenna as well and transmitted to the surface where it is detected by generator/receiver 18.

Figure 1B:
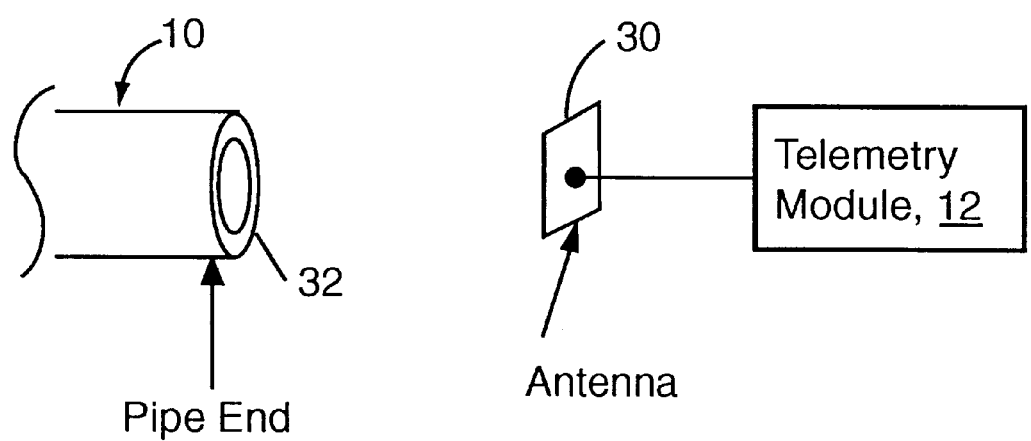
FIG. 1b shows an example of the expanded electronics module illustrating a planar antenna for coupling the end of the pipe with the electronics module for a communication using modulated reflectance, where the modulated carrier wave is returned to the pipe for transmission to the surface.

FIG. 1b shows a planar example of antenna, 30, for coupling the end, 32, of pipe 10 with electronics module 12 for down-hole communication using modulated reflectance, where the modulated carrier wave is returned to the pipe for transmission to the surface. A parabolic or other focusing shape for antenna 30 will improve the return signal to pipe 10. Additionally, larger areas also improve the signal returned to the pipe.

EXAMPLE 2

Pipe as a Waveguide

Figure 2A:
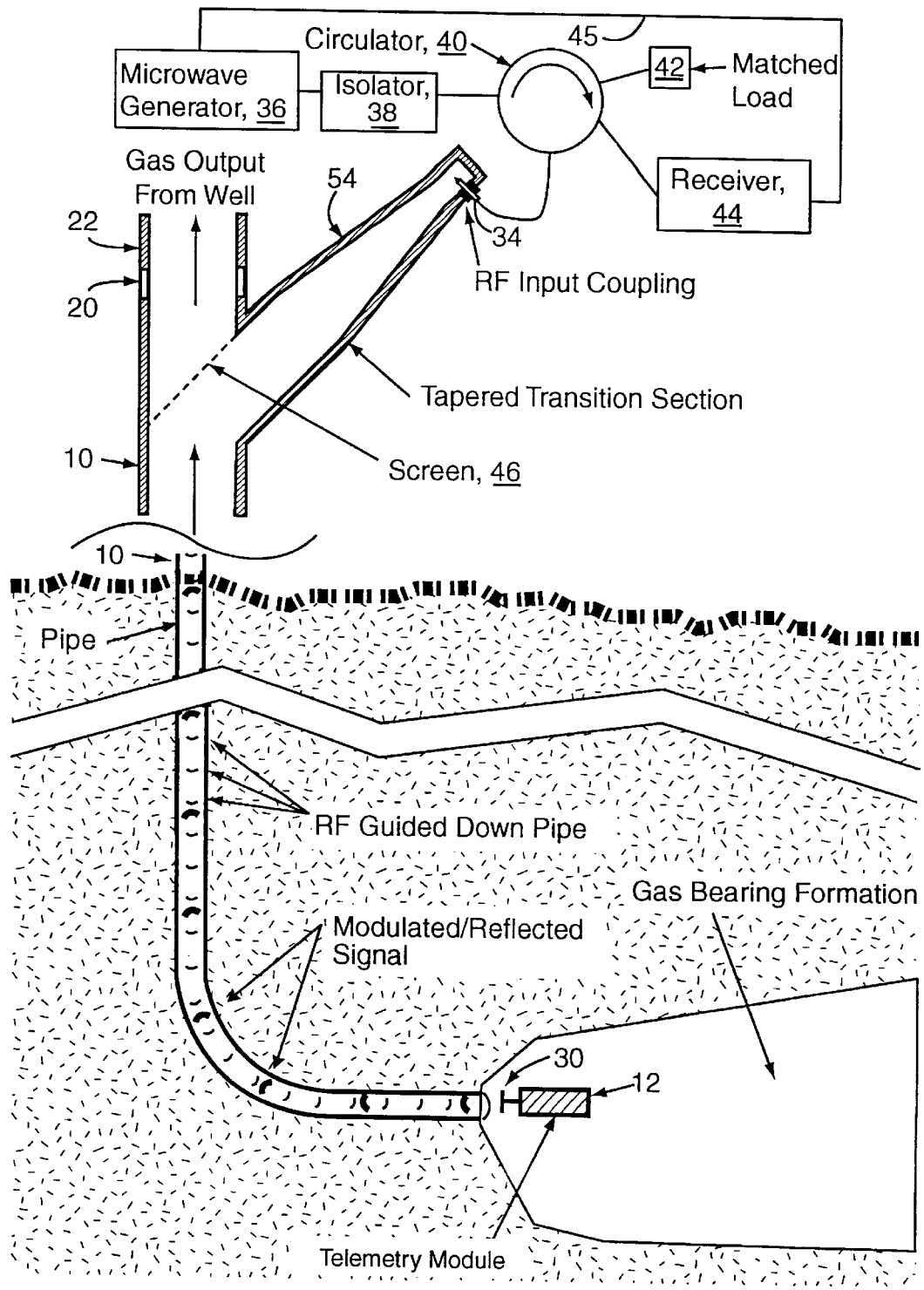

FIG. 2a is a schematic representation of a second embodiment of the present invention where the pipe is used as a waveguide for both the carrier wave and the modulated reflected signal. For clarity, the scale of the above-ground portion of the figure is larger than that for the below-ground components. Microwave energy to electrically isolated microwave coupling pin, 34, is generated by microwave generator, 36, which provides the carrier wave through isolator, 38, and circulator, 40. The carrier wave is properly matched into pipe 10 using matched load, 42. Conducting pipe 10 acts as a waveguide for both the carrier wave introduced thereto and for the modulated, reflected wave from antenna 30 (See FIG. 2b and FIG. 2d hereof) in electrical connection with electronics module 12. The modulated return signal passes through circulator 40 detector/receiver, 44. Detector/receiver 44 is placed in electrical communication with microwave generator 36 in order to permit synchronous signal detection. Electrically conducting screen, 46, in cooperation with tapered transition section, 48, direct the microwave energy from coupling pin 34 smoothly into pipe 10 while permitting gas to flow between pipe 10 through insulating transition 20 into pipe network 22.

Figure 2B:
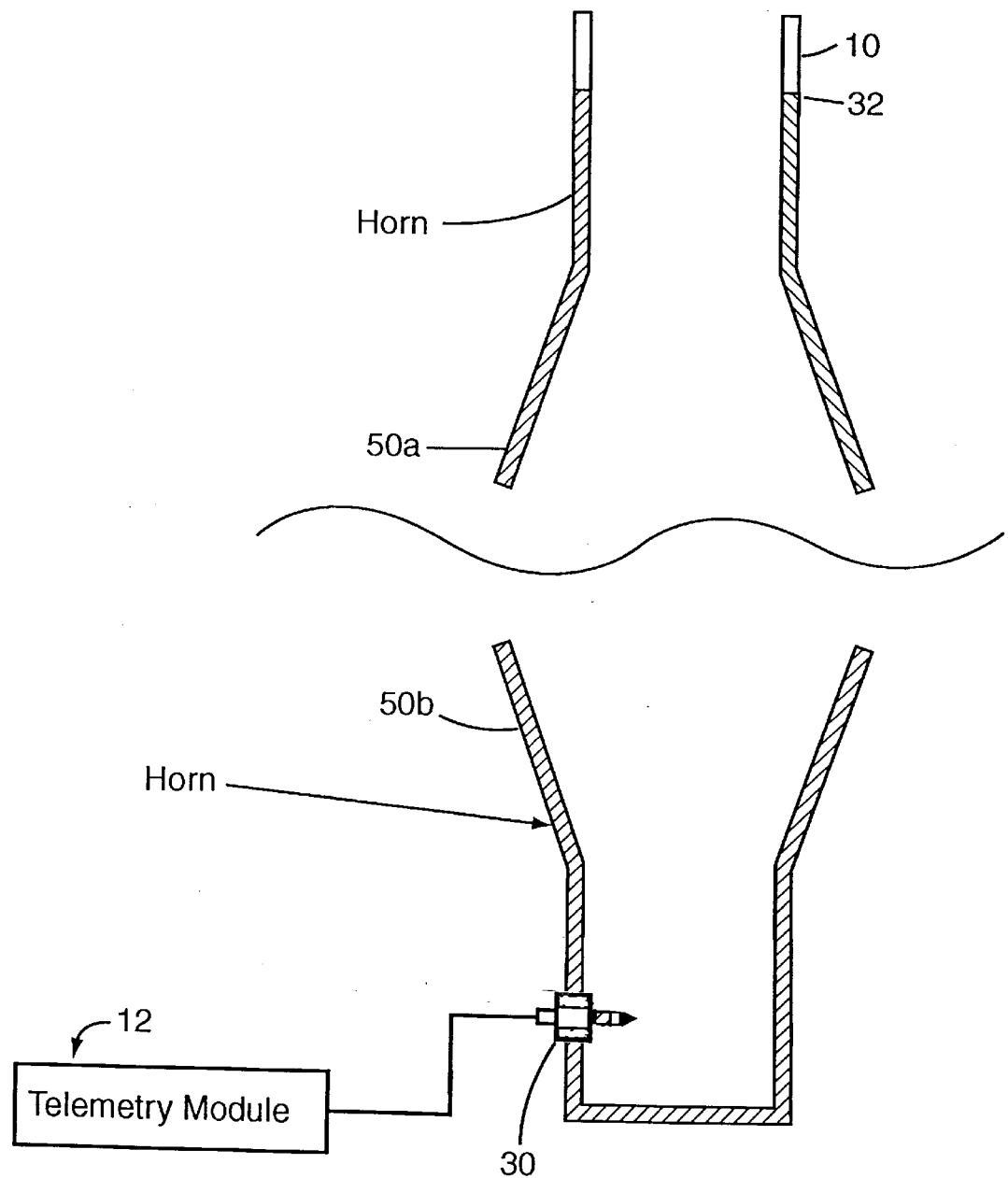
FIG. 2b is a schematic representation of the deployment of microwave horns for communication between the electronics module and the pipe using modulated reflectance, where the modulated carrier wave is returned to the pipe for transmission to the surface.

FIG. 2b is a schematic representation of the deployment of separated, matched microwave horns, 50a and 50b, for improving the launching of the carrier wave from pipe 10 (horn 50a) and the receiving of the modulated RF signals reflected by antenna 30 (horn 50b) in communication with electronics module 12 by pipe 10 by the modulated reflectance technique of the present invention. The modulated carrier wave is returned to pipe 10 acting as a waveguide for transmission of the modulated reflected wave to the surface. The modulated reflectance signal is reintroduced to horn 50b through electrically isolated microwave pin antenna 30 after being modulated by electronics module 12 in electrical communication therewith. This is achieved by modulating the impedance of load matched into horn 50b.

Figure 2C:
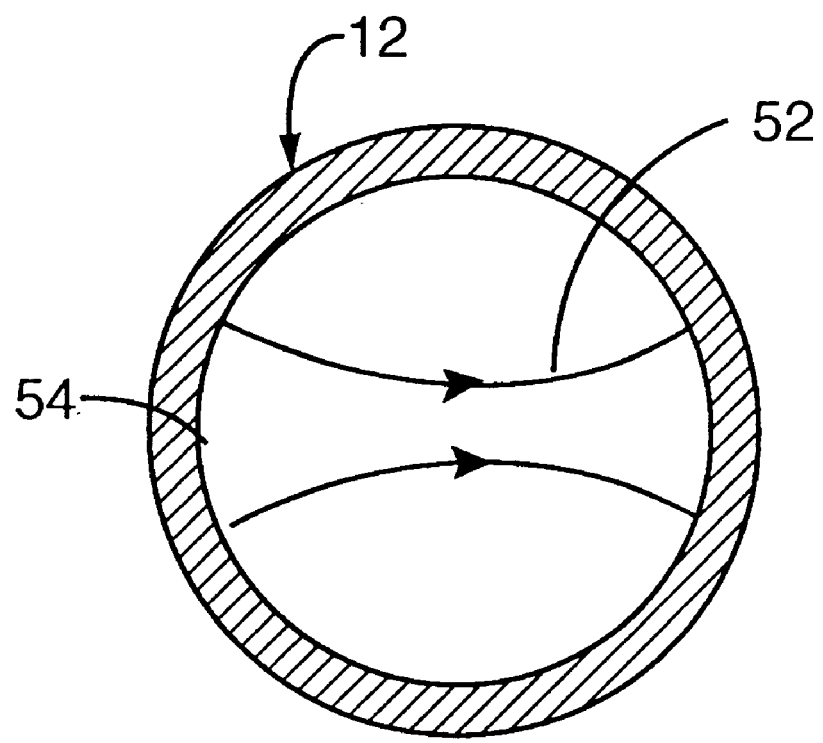
Figure 2D:
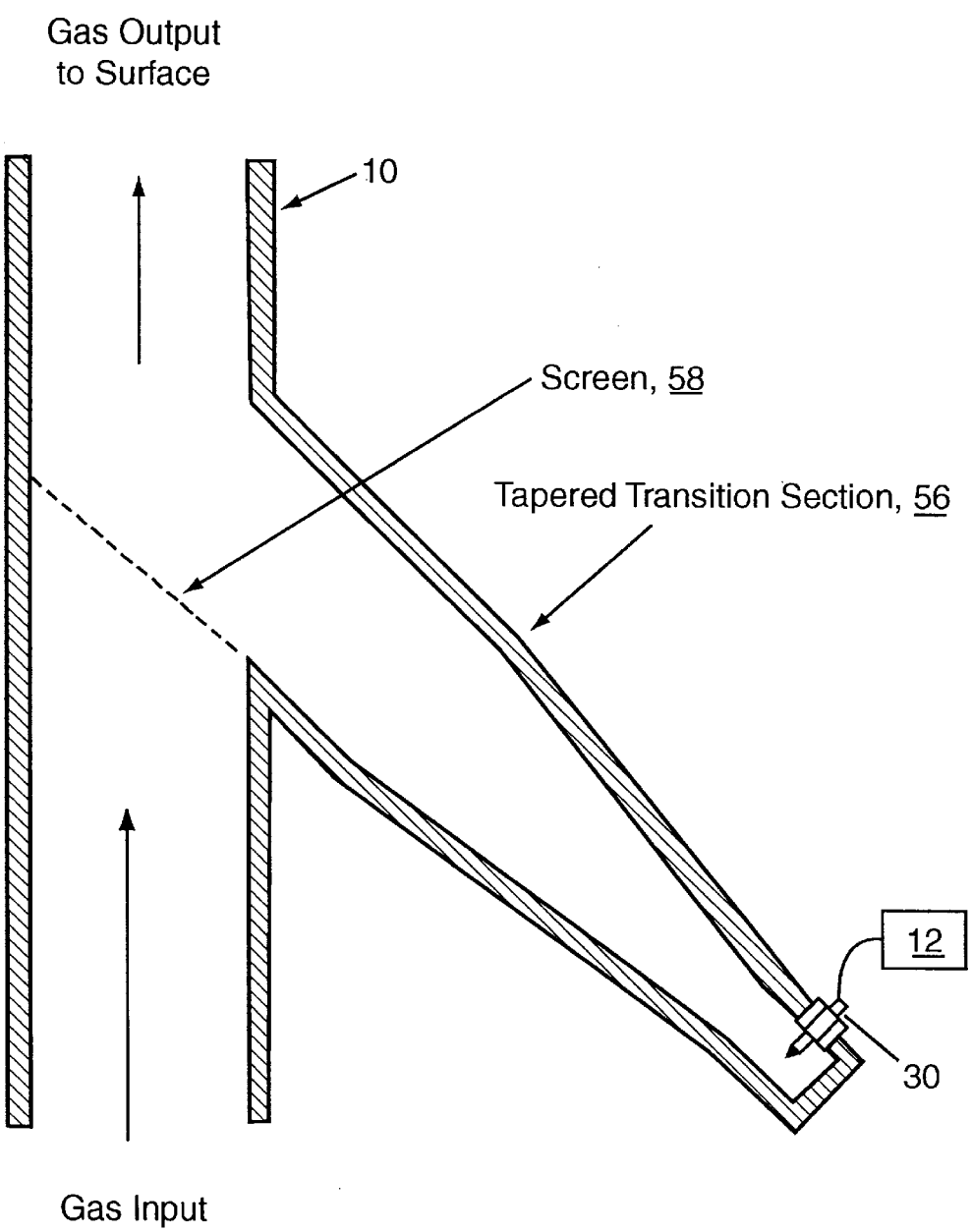
FIG. 2d is a schematic representation of a transition section for extracting the microwave energy from the pipe and directing it to an antenna which operates in a similar manner to the horn configuration illustrated in FIG. 2b hereof.

FIG. 2c shows the $TE_{11}$ mode, 52, in the interior, 54, of a 12 cm i.d. circular electrically conducting pipe 10, while FIG. 2d shows tapered transition section, 56, which, in cooperation with electrically conducting screen, 58, smoothly extracts the carrier microwave energy from pipe 10, and smoothly reintroduces the modulated reflected wave from antenna 30 thereto responsive to measurements made by instrument module 12. The transitions operate in a similar manner to the separated horn configuration (50a and 50b) illustrated in FIG. 2b hereof. This configuration is particularly appropriate for gas wells where signal attenuation from materials flowing through the pipe; that is, gases, is minimal (typical gases are expected to add at most 3 dB of attenuation per approximately 2.5 km of pipe). Since the signal has to pass through whatever medium is contained by pipe 10, this embodiment has less utility for long runs of a well producing oil or water, gas or water vapor as a result of substantial attenuation. Note that although reflectance of carrier signal back to the detector in the vicinity of the surface is not expected to be great due to the high attenuation of down-hole environments, modern detectors and electronics technology can easily separate modulated signals from carrier frequencies even if there is significant unmodulated reflection present, so "swamping" of the detector is not a problem.

EXAMPLE 3

External, Through-ground Communication

Ultra-low or extremely low frequency transmissions are utilized for submarine and other through-ground or through-water wireless communications since ultra-low or extremely frequency is much less attenuated by earth and water formations. Two embodiments for use with ultra-low frequency technology are described. A first does not utilize modulated reflectance, while the second provides both the ability to eliminate the need for batteries or other power source at the sensor package and the ability to communicate therewith by using modulated reflectance.

Figure 3A:
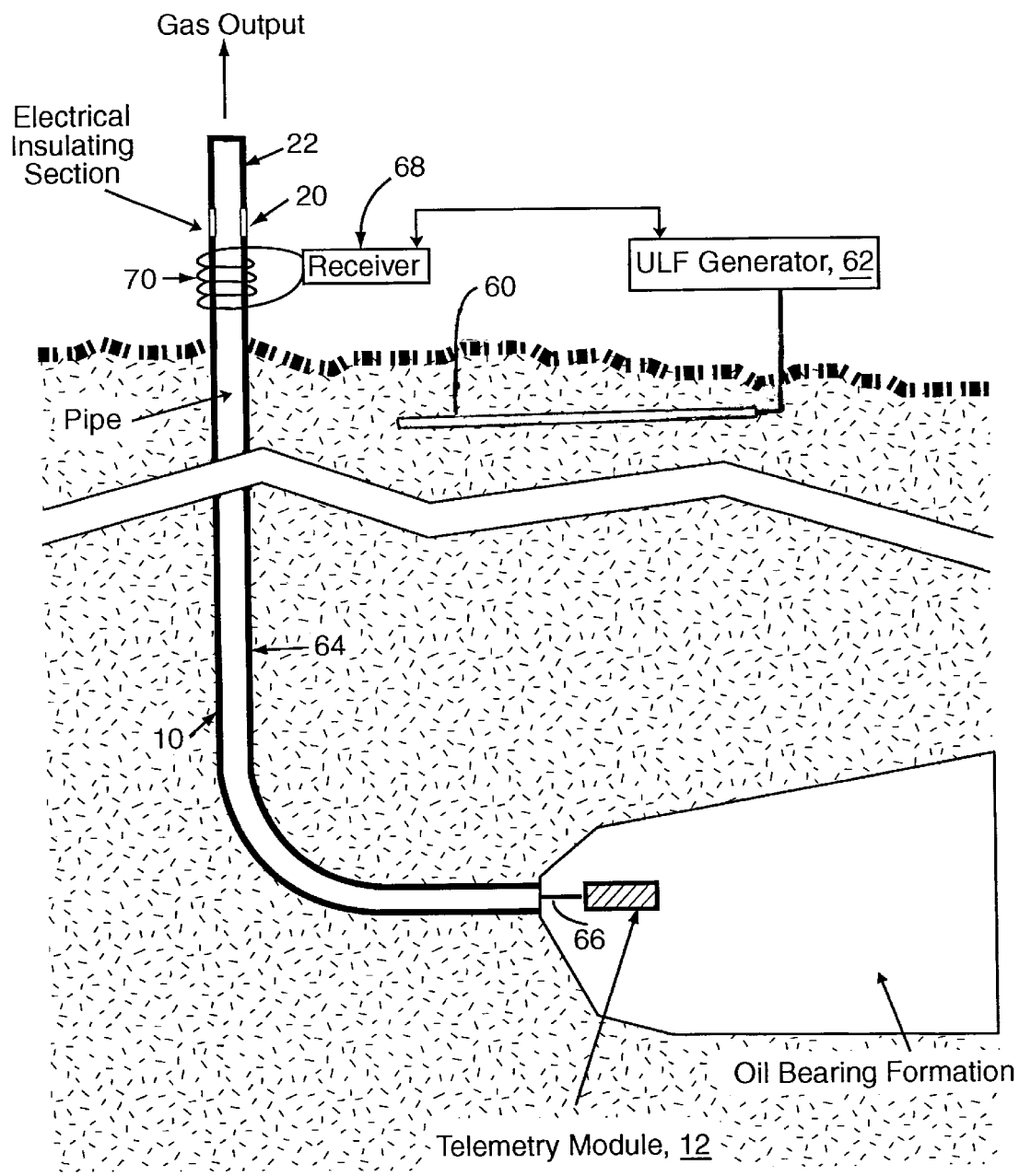

FIG. 3a is a schematic representation of a non-modulated reflectance embodiment of the present invention wherein an ultra-low frequency or extremely low frequency signal is generated using antenna, 60, located in a generally horizontal position on the surface and powered by frequency generator, 62, and wherein the combined down-hole instrument module 12 and electrically conducting pipe 10 cooperate as a receiving antenna, 64, such that instrument module 12 modulates the characteristic impedance of receiving antenna 64 in response to a chosen parameter being monitored through direct electrical connection, 66, whereby a modulated signal is received on the surface by receiver, 68, in the vicinity of the proximal end of pipe 10. Coil, 70, couples the modulated signal from the surface of pipe 10 and directs it to receiver 68.

Figure 3B:
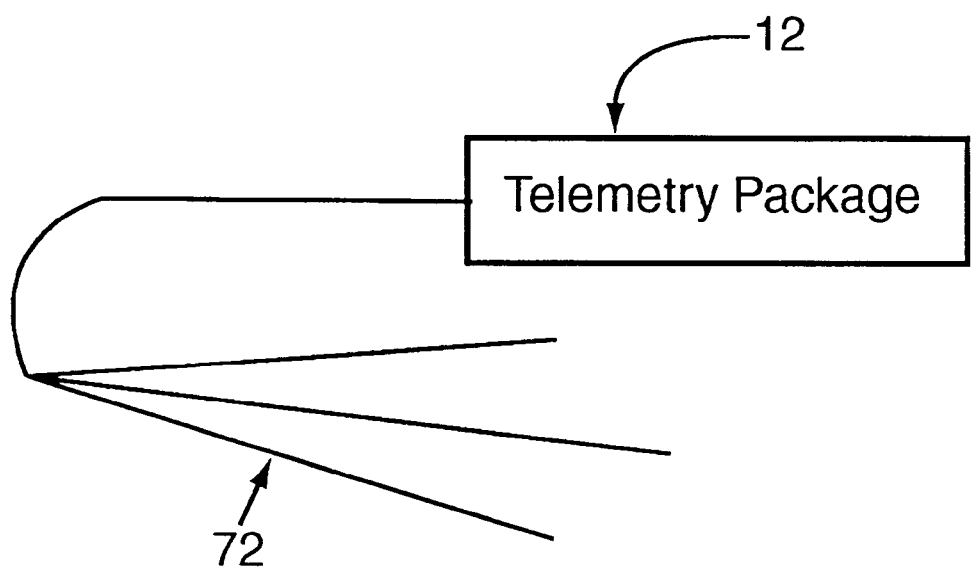
FIG. 3b shows a low-frequency antenna in electrical connection with the down-hole electronics module such that the signal from the surface is received directly by the instrument module without the use of the pipe, and the modulated reflectance signal returned to the surface thereby.

FIG. 3b shows a modulated reflectance variation of the embodiment described in FIG. 3a. Low-frequency or extremely low frequency antenna, 72, is placed in electrical communication with down-hole electronics module 12 such that the carrier wave from surface antenna 60 is received directly by instrument module 12 without the use of the pipe 10, and the modulated reflected signal achieved by modulating the characteristic impedance of antenna 72 is transmitted by this antenna to an antenna in electrical communication with receiver 68 of FIG. 3a (antenna not shown). This can be used to both supply electrical energy to the down-hole module and communicate therewith.

Figure 4A:
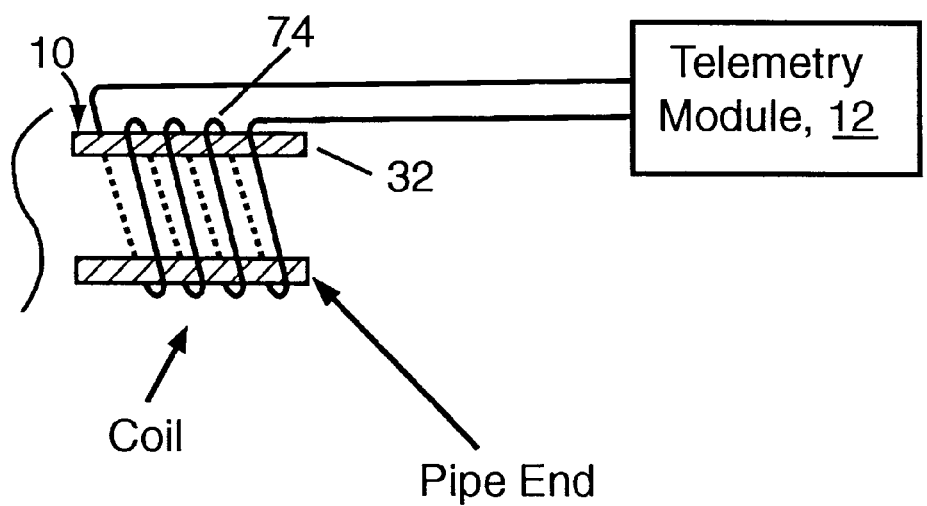
Figure 4B:
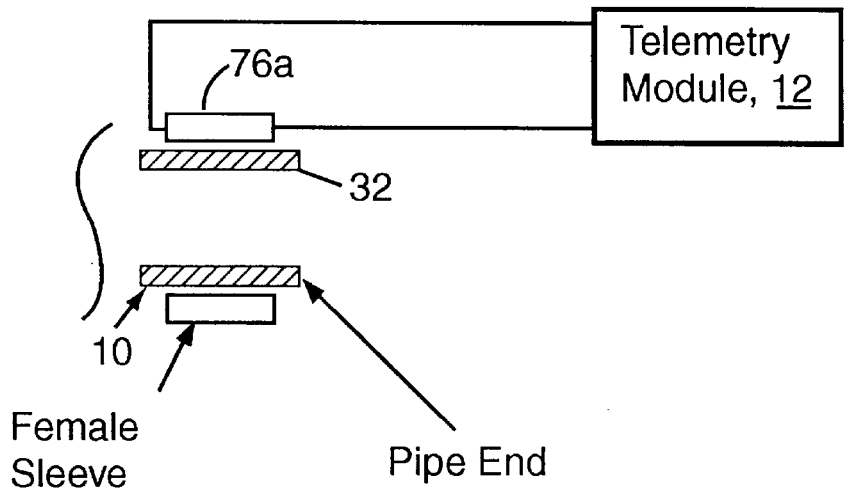
Figure 4C:
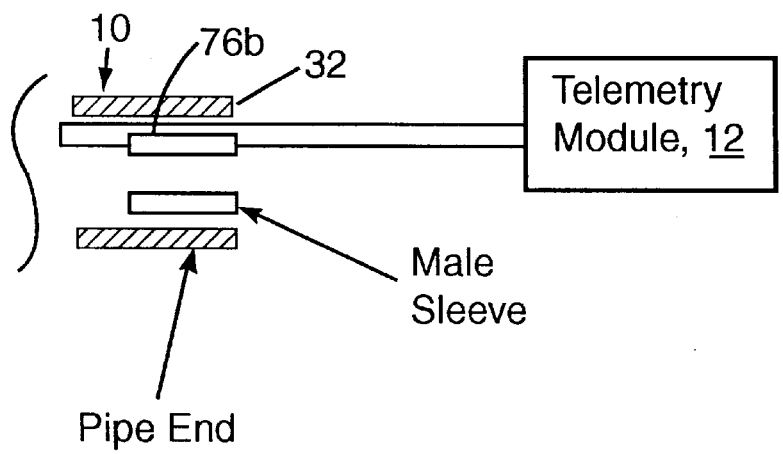

Other variations of the coupling of telemetry module 12 with the distal end of pipe 10 for modulated reflectance use are shown in FIGS. 4a–4c hereof. FIG. 4a shows a schematic representation of the use of coil, 74, wound around the outside of the end 32 of pipe 10 in electrical connection with electronics module 12, while FIGS. 4b and 4c show schematic representations of sleeve, 76a and 76b, disposed either outside (76a of FIG. 4a) or inside (76b or FIG. 4b) of the end 32 of pipe 10, respectively. These configurations can be used with the radiating pipe of FIG. 1a hereof or with antenna 64 of pipe 10 in FIG. 3a.

EXAMPLE 4

Power Storage & Powering Down-hole Electronics

Figure 5:
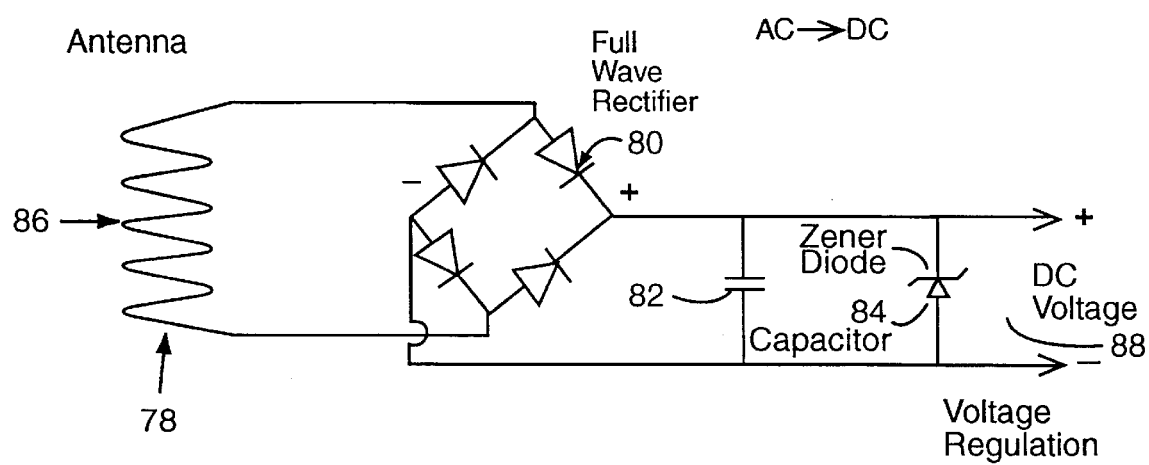
FIG. 5 shows a sample electrical circuit for receiving RF energy and converting this energy into dc for charging capacitors and/or batteries down-hole without the need for wires extending to the surface.

A recurring need in oil well environments is the remote operation of valves and electronic systems down-hole. As an example, valves are often located along a pipe or at the end of a pipe run or at branches of manifolds. The operation of such valves is an infrequent event, perhaps once a month, but an important part of well control. Using the apparatus and method of the present invention as described hereinabove, RF energy can be supplied to the sensor module and can be stored in capacitors or batteries. Capacitors, unlike typical "wet" batteries, are quite robust. They are typically made of ceramics for the dielectric portion and stable metals for the conductive elements. Capacitors are able to withstand the rigorous down-hole well conditions. Radio frequency energy can be continuously supplied to the sensor package and, although the real time energy that reaches the package is small, sufficient energy can be supplied to power infrequent valve operation. FIG. 5 shows a typical charging circuit suitable to this use. Loop antenna, 78, in electrical connection with full-wave rectifier, 80, capacitor, 82, and voltage regulator, 84, convert RF energy, 86, received by loop antenna 78 into dc, 88, for storage. The RF energy can be supplied directly by apparatus shown in FIG. 3a, indirectly by the carrier wave used for modulated reflectance communication with the down-hole telemetry module as shown in FIGS. 1a, 1b, 2a–2d, and 3b, or by both. Radio frequency coupling apparatus might include those shown in FIGS. 4a–4c hereof.

Using the apparatus described in FIGS. 2a–2d hereof useful for the gas wells, the following calculations illustrate attenuation of RF energy being transmitted by the electrically conducting pipe acting as a waveguide, from the proximal or surface location to the distal or down-hole location thereof. The mode of the electromagnetic wave in the well pipe is assumed to be $TE_{11}$, (FIG. 2c hereof), introduced using the apparatus described in FIG. 2a hereof. Down-hole modulated reflectance apparatus is assumed to be similar to that shown in FIG. 2d. The $TE_{11}$ mode was chosen because it is well understood in terms of coupling and generation and is expected to yield the worst-case results for those modes being practically considered.

It is assumed that the electrically conducting pipe diameter is 12 cm. This assumption of course can be changed to reflect the dimension of the actual pipe being used. Thus the pipe radius is 6 cm (a=2.3622 in.). For the $TE_{11}$ mode, the cutoff wavelength of the pipe (the wavelength above which waveguide propagation is severely attenuated) is given by:

$$\lambda_c = 3.412a.$$

This results in a wavelength of 8 in. (20 cm) with an associated free-space frequency of 1.4654 GHz. The equation for loss in a copper waveguide using $TE_{11}$ mode is given by:

$$L = \frac{0.423}{a^{\frac{3}{2}}} \times \frac{\left(\frac{f}{f_c}\right)^{-\frac{1}{2}} + \left(\frac{1}{2.38}\right)\left(\frac{f}{f_c}\right)^{\frac{3}{2}}}{\left[\left(\frac{f}{f_c}\right)^2 - 1\right]^{\frac{1}{2}}} \text{ dB}/100 \text{ ft}$$

Evaluating this equation for a frequency at which minimum loss occurs yields a value of 4.54 GHz. For an iron pipe the resistivity is 9.71 compared to 1.7421 for copper, which is assumed for the above equation. The above equation can be scaled to reflect the difference in materials as follows:

$$L_{iron} = L \times \sqrt{\frac{9.71}{1.7421}} \text{ dB}/100 \text{ ft.}$$

This yields a minimum loss at 4.54 GHZ for an iron pipe of 0.268 dB/100 ft. Assuming the pipe is 2.5 km (8202 ft) long, the total loss would be 21 dB at 4.54 GHz. Assuming a coupling efficiency of 75% in coupling energy into the waveguide, the power density in the waveguide is:

$$PD = 0.75 \times \frac{P_t}{(\pi r^2)},$$

where $P_t$ is the transmitted power from a coaxial cable into the waveguide and r is the radius of the pipe, 6 cm, for the present calculation. The effective absorption area (EAA) for a receive antenna is:

$$A_w = \frac{\lambda^2 G_r}{4\pi},$$

where $\lambda$ is wavelength associated with the frequency of minimum attenuation, $G_r$ is the gain of the receive antenna. Thus for a 10 dB gain the EAA of antenna is 0.0017 $m^2$. The power density, at the receive antenna is reduced by the attenuation L, where L is given by:

$$PD_r = PD \times L,$$

where L is linear (0.0079 in the present example).

Figure 6:
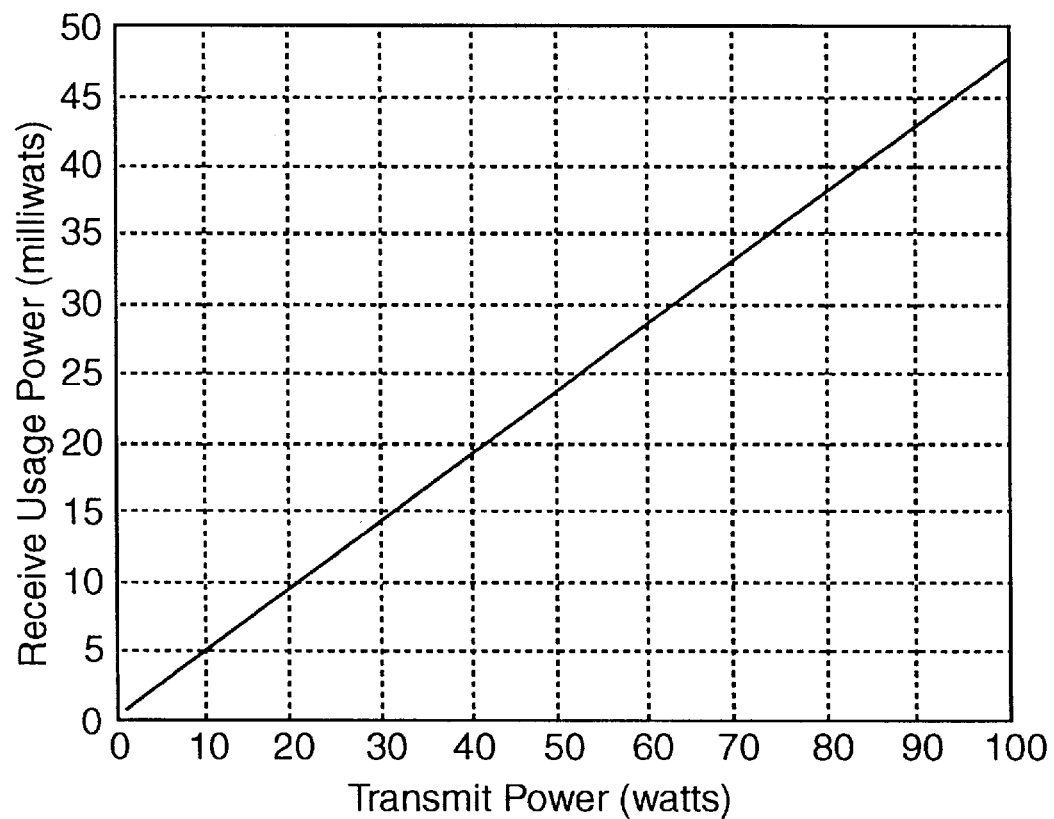
FIG. 6 is a graph of the rectified radio frequency power received at the distal end of a pipe as a function of the radio frequency power introduced at the proximal end thereof.

The power received at the receive antenna is therefore given by $$P_r = ant_{eff} \times A_w \times PD_t$$

where it is assumed that all of the power density in the waveguide is being used. The antenna efficiency can be approximated to be 80%. Assuming a 65% conversion efficiency from received RF power, $P_r$, to DC power yields the graph shown in FIG. 6.

In summary, while the down-hole power is modest in this worst-case example, it is adequate for the needs of communication using modulated reflectance as well as for storage of sufficient energy over time to enable auxiliary functions, such as intermittent valve operation, to be performed.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited tothe particular use contemplated. It is intended that the scope of the invention be defined by the claims appended hereto.

What is claimed is:

1. A method for communicating with the distal end of an electrically conducting pipe which comprises the steps of:
    (a) generating a radio frequency signal having a chosen frequency at the proximal end of the electrically conducting pipe such that the electrically conducting pipe radiates the signal at least in the vicinity of the distal end thereof;
    (b) reflecting the radiated radio frequency signal in the vicinity of the distal end of the electrically conducting pipe such that the reflected radio frequency signal is received by the conducting pipe and transmitted to the proximal end thereof;
    (c) modulating the reflected radio frequency signal in response to data received from the vicinity of the distal end of the electrically conducting pipe; and
    (d) detecting the modulated, reflected signal at the proximal end of the electrically conducting pipe.

2. The method as described in claim 1, wherein said step of modulating the reflected radio frequency signal comprises amplitude or phase modulation.

3. The method as described in claim 1, wherein the chosen frequency is selected such that the radiation of the signal by the electrically conducting pipe in the vicinity of the distal end thereof is maximized.

4. The method as described in claim 1, wherein the distal end of the electrically conducting pipe is underground.

5. The method as described in claim 1, wherein the electrically conducting pipe is fabricated from materials selected from the group consisting of metals, conducting polymers and carbon fibers.

6. The method as described in claim 1, further comprising the step of electrically isolating the proximal end of the electrically conducting pipe from any electrically conducting attachments thereto.

7. An apparatus for communicating with the distal end of an electrically conducting pipe which comprises in combination:
    (a) a radio frequency generator for generating a radio frequency signal having a chosen frequency at the proximal end of the electrically conducting pipe such that the electrically conducting pipe radiates the signal at least in the vicinity of the distal end thereof;

(b) data acquisition apparatus responsive to chosen input disposed in the vicinity of the distal end of the electrically conducting pipe;

(c) an antenna for reflecting the radio frequency signal in the vicinity of the distal end of the electrically conducting pipe such that the reflected radio frequency signal is received by the electrically conducting pipe and transmitted to the proximal end thereof;

(d) an impedance switch in electrical connection with said antenna for modulating the electrical impedance thereof, whereby the radio frequency signal reflected by said antenna is modulated in response to data acquired by said data acquisition apparatus; and (e) a detector for receiving the reflected modulated radio frequency signal disposed in the vicinity of the proximal end of the electrically conducting pipe.

8. The apparatus as described in claim 7, wherein the reflected modulated radio frequency signal is amplitude or phase modulated.

9. The apparatus as described in claim 7, wherein the chosen frequency is selected such that the radiation of the signal by the electrically conducting pipe in the vicinity of the distal end thereof is maximized.

10. The apparatus as described in claim 7, wherein the distal end of the electrically conducting pipe is underground.

11. The apparatus as described in claim 7, wherein the electrically conducting pipe is fabricated from materials selected from the group consisting of metals, conducting polymers and carbon fibers.

12. The apparatus as described in claim 7, further comprising an electrical insulator for electrically isolating the proximal end of the electrically conducting pipe from any electrically conducting attachments thereto.

13. The apparatus as described in claim 7, further comprising an RF shield disposed in the vicinity of the proximal end of the electrically conducting pipe for reducing RF radiation in the vicinity of the proximal end of the electrically conducting pipe.

14. A method for communicating with the distal end of an electrically conducting pipe which comprises the steps of:

(a) generating a radio frequency signal having a chosen frequency at the proximal end of the electrically conducting pipe such that the signal remains within the electrically conducting pipe and is transmitted thereby to the distal end thereof whereafter the radio frequency signal exits the electrically conducting pipe;

(b) reflecting the radio frequency signal exiting the distal end of the electrically conducting pipe such that the reflected signal reenters the electrically conducting pipe, remains therein and is transmitted to the proximal end thereof;

(c) modulating the reflected radio frequency signal in response to data received in the vicinity of the distal end of the electrically conducting pipe; and (d) detecting the modulated, reflected signal at the proximal end of the electrically conducting pipe.

15. The method as described in claim 14, wherein said step of modulating the reflected radio frequency signal includes amplitude or phase modulation.

16. The method as described in claim 14, wherein the chosen frequency is selected such that the radiation of the signal by the electrically conducting pipe in the vicinity of the distal end thereof is maximized.

17. The method as described in claim 14, wherein the distal end of the electrically conducting pipe is underground.

18. The method as described in claim 14, wherein the electrically conducting pipe is fabricated from materials selected from the group consisting of metals, conducting polymers and carbon fiber.

19. The method as described in claim 14, further comprising the step of electrically isolating the proximal end of the electrically conducting pipe from any electrically conducting attachments thereto.

20. An apparatus for communicating with the distal end of an electrically conducting pipe which comprises in combination:

(a) a radio frequency generator for generating a radio frequency signal having a chosen frequency at the proximal end of the electrically conducting pipe such that the radio frequency signal remains within the electrically conducting pipe and is transmitted to the distal end thereof whereafter the radio frequency signal exits the electrically conducting pipe;

(b) data acquisition apparatus responsive to chosen input disposed in the vicinity of the distal end of the electrically conducting pipe;

(c) an antenna for reflecting the radio frequency signal exiting the distal end of the electrically conducting pipe such that the reflected radio frequency signal reenters the electrically conducting pipe, remains therein and is transmitted to the proximal end thereof;

(d) an impedance switch in electrical connection with said antenna for modulating the electrical impedance thereof, whereby the radio frequency signal reflected by said antenna is modulated in response to data acquired by said data acquisition apparatus; and (e) a detector for receiving the reflected modulated radio frequency signal at the proximal end of the electrically conducting pipe.

21. The apparatus as described in claim 20, wherein the radio frequency signal reflected by said antenna is amplitude or phase modulated.

22. The apparatus as described in claim 20, wherein the chosen frequency is selected such that the radiation of the signal by the electrically conducting pipe in the vicinity of the distal end thereof is maximized.

23. The apparatus as described in claim 20, wherein the distal end of the electrically conducting pipe is underground.

24. The apparatus as described in claim 20, wherein the electrically conducting pipe is fabricated from materials selected from the group consisting of metals, conducting polymers and carbon fibers.

25. The apparatus as described in claim 20, further comprising an electrically insulating section for electrically isolating the proximal end of the electrically conducting pipe from any electrically conducting attachments thereto.

26. The apparatus as described in claim 20, further comprising a first horn in electrical contact with the distal end of the electrically conducting pipe and a second horn in electrical contact with said antenna, wherein said first horn and said second horn are disposed such that the radio frequency signal exiting the electrically conducting pipe is maximized, the radio frequency signal received by said antenna is maximized and the reflected radio frequency signal reentering the electrically conducting pipe is maximized.

27. A method for communicating with the distal end of an electrically conducting pipe buried in the ground, which comprises the steps of:

(a) generating an electrical signal having a chosen ultra-low or extremely low frequency in the ground in the vicinity of the proximal end of the electrically conducting pipe such that the signal penetrates the ground at least to the vicinity of the buried distal end thereof;

(b) receiving the signal using the electrically conducting pipe as an antenna;

(c) modulating the impedance of the electrically conducting pipe in response to data received in the vicinity of the distal end of the electrically conducting pipe, whereby the signal received by the electrically conducting pipe is modulated; and (d) detecting the modulated, received signal at the proximal end of the electrically conducting pipe.

28. The method as described in claim 27, wherein said step of modulating the reflected radio frequency signal includes amplitude or phase modulation.

29. The method as described in claim 27, wherein the chosen ultra-low or extremely low frequency is selected such that the signal reaching the vicinity of the distal end of the electrically conducting pipe is maximized.

30. The method as described in claim 27, wherein the electrically conducting pipe is fabricated from materials selected from the group consisting of metals, conducting polymers and carbon fiber.

31. An apparatus for communicating with the distal end of an electrically conducting pipe buried in the ground which comprises in combination:

(a) a generator for generating a chosen ultra-low or extremely low frequency signal in the ground in the vicinity of the proximal end of the electrically conducting pipe such that the signal penetrates the ground at least to the vicinity of the buried distal end thereof, whereby the electrically conducting pipe receives the signal;

(b) data acquisition apparatus responsive to chosen input disposed in the vicinity of the distal end of the electrically conducting pipe;

(c) an impedance switch in electrical connection with the electrically conducting pipe for modulating the electrical impedance thereof, whereby the signal received by the electrically conducting pipe is modulated in response to data acquired by said data acquisition apparatus; and (d) a detector for receiving the modulated signal at the proximal end of the electrically conducting pipe.

32. The apparatus as described in claim 31, wherein the modulated signal is amplitude or phase modulated.

33. The apparatus as described in claim 31, wherein the chosen ultra-low or extremely low frequency is selected such that the radiation of the signal by the electrically conducting pipe in the vicinity of the distal end thereof is maximized.

34. The apparatus as described in claim 31, wherein the electrically conducting pipe is fabricated from materials selected from the group consisting of metals, conducting polymers and carbon fibers.

35. A method for providing electrical energy to the distal end of an electrically conducting pipe which comprises the steps of:

(a) generating a radio frequency signal having a chosen frequency at the proximal end of the electrically conducting pipe such that the electrically conducting pipe radiates the signal at least in the vicinity of the distal end thereof;

(b) receiving the radio frequency signal in the vicinity of the distal end of the electrically conducting pipe;

(c) converting the radio frequency signal into dc electrical current; and (d) storing the electrical current converted in the vicinity of the distal end of the electrically conducting pipe.

36. An apparatus for providing electrical energy to the distal end of an electrically conducting pipe which comprises in combination:

(a) a radio frequency signal generator for producing a chosen frequency at the proximal end of the electrically conducting pipe such that the electrically conducting pipe radiates the signal at least in the vicinity of the distal end thereof;

(b) means for receiving the radio frequency signal in the vicinity of the distal end of the electrically conducting pipe;

(c) a rectifier for converting the radio frequency signal into dc electrical current; and (d) means for storing the electrical current converted in the vicinity of the distal end of the electrically conducting pipe.

37. The apparatus as described in claim 36, wherein said means for storing the electrical current converted in the vicinity of the distal end of the electrically conducting pipe is selected from the group consisting of capacitors and batteries.

38. A method for providing electrical energy to the distal end of an electrically conducting pipe which comprises the steps of:

(a) generating a radio frequency signal having a chosen frequency at the proximal end of the electrically conducting pipe such that the signal remains within the electrically conducting pipe and is conducted thereby to the distal end thereof whereafter the radio frequency signal exits the electrically conducting pipe;

(b) receiving the radio frequency signal exiting the distal end of the electrically conducting pipe;

(c) converting the received radio frequency signal into dc electrical current; and (d) storing the electrical current in the vicinity of the distal end of the electrically conducting pipe.

39. An apparatus for providing electrical energy to the distal end of an electrically conducting pipe which comprises in combination:

(a) a radio frequency signal generator for producing a chosen frequency at the proximal end of the electrically conducting pipe such that the signal remains within the electrically conducting pipe and is conducted thereby to the distal end thereof whereafter the radio frequency signal exits the electrically conducting pipe;

(b) means for receiving the radio frequency signal exiting the distal end of the electrically conducting pipe;

(c) a rectifier for converting the received radio frequency signal into dc electrical current; and (d) means for storing the electrical current in the vicinity of the distal end of the electrically conducting pipe.

40. The apparatus as described in claim 39, wherein said means for storing the electrical current converted in the vicinity of the distal end of the electrically conducting pipe is selected from the group consisting of capacitors and batteries.

41. A method for providing electrical energy to the distal end of an electrically conducting pipe buried in the ground, which comprises the steps of:

(a) generating an electrical signal having a chosen ultra-low or extremely low frequency in the ground in the vicinity of the proximal end of the electrically conducting pipe such that the signal penetrates the ground to the vicinity of the buried distal end thereof;

(b) receiving the electrical signal in the vicinity of the buried distal end of the electrically conducting pipe;

(c) converting the received radio frequency signal into dc electric current; and (d) storing the electrical current in the vicinity of the distal end of the electrically conducting pipe.

42. An apparatus for providing electrical energy to the distal end of an electrically conducting pipe buried in the ground, which comprises in combination:

(a) an electrical signal generator for producing a chosen ultra-low or extremely low frequency in the ground in the vicinity of the proximal end of the electrically conducting pipe such that the signal penetrates the ground to the vicinity of the buried distal end thereof;

(b) means for receiving the electrical signal in the vicinity of the buried distal end of the electrically conducting pipe;

(c) a rectifier for converting the received radio frequency signal into dc electric current; and (d) means for storing the electrical current in the vicinity of the distal end of the electrically conducting pipe.

43. The apparatus as described in claim 42, wherein said means for storing the electrical current converted in the vicinity of the distal end of the electrically conducting pipe is selected from the group consisting of capacitors and batteries.

44. A method for communicating with and for providing electrical energy to the distal end of an electrically conducting pipe which comprises the steps of:

(a) generating a radio frequency signal having a chosen frequency at the proximal end of the electrically conducting pipe such that the electrically conducting pipe radiates the signal at least in the vicinity of the distal end thereof;

(b) reflecting a first portion of the radiated radio frequency signal in the vicinity of the distal end of the electrically conducting pipe such that the reflected radio frequency signal is received by the conducting pipe and transmitted to the proximal end thereof;

(c) modulating the reflected radio frequency signal in response to data received from the vicinity of the distal end of the electrically conducting pipe;

(d) detecting the modulated, reflected signal at the proximal end of the electrically conducting pipe;

(e) receiving a second portion of the radiated radio frequency signal in the vicinity of the distal end of the electrically conducting pipe;

(f) converting the received radio frequency signal into dc electric current; and (g) storing the electrical current in the vicinity of the distal end of the electrically conducting pipe.

45. An apparatus for communicating with for communicating with and for providing electrical energy to the distal end of an electrically conducting pipe which comprises in combination:

(a) a radio frequency generator for generating a radio frequency signal having a chosen frequency at the proximal end of the electrically conducting pipe such that the electrically conducting pipe radiates the signal at least in the vicinity of the distal end thereof;

(b) data acquisition apparatus responsive to chosen input disposed in the vicinity of the distal end of the electrically conducting pipe;

(c) an antenna for reflecting a first portion of the radio frequency signal in the vicinity of the distal end of the electrically conducting pipe such that the reflected radio frequency signal is received by the electrically conducting pipe and transmitted to the proximal end thereof;

(d) an impedance switch in electrical connection with said antenna for modulating the electrical impedance thereof, whereby the radio frequency signal reflected by said antenna is modulated in response to data acquired by said data acquisition apparatus; and (e) a detector for receiving the reflected modulated radio frequency signal disposed in the vicinity of the proximal end of the electrically conducting pipe;

(f) means for receiving a second portion of the radiated radio frequency signal in the vicinity of the distal end of the electrically conducting pipe;

(g) a rectifier for converting the received radio frequency signal into dc electric current; and (h) means for storing the electrical current in the vicinity of the distal end of the electrically conducting pipe.

46. The apparatus as described in claim 45, wherein said means for storing the electrical current converted in the vicinity of the distal end of the electrically conducting pipe is selected from the group consisting of capacitors and batteries.

47. A method for communicating with and supplying electrical energy to the distal end of an electrically conducting pipe which comprises the steps of:

(a) generating a radio frequency signal having a chosen frequency at the proximal end of the electrically conducting pipe such that the signal remains within the electrically conducting pipe and is transmitted thereby to the distal end thereof whereafter the radio frequency signal exits the electrically conducting pipe;

(b) reflecting a first portion of the radio frequency signal exiting the distal end of the electrically conducting pipe such that the reflected signal reenters the electrically conducting pipe, remains therein and is transmitted to the proximal end thereof;

(c) modulating the reflected radio frequency signal in response to data received in the vicinity of the distal end of the electrically conducting pipe;

(d) detecting the modulated, reflected signal at the proximal end of the electrically conducting pipe;

(e) receiving a second portion of the radio frequency signal exiting the distal end of the electrically conducting pipe;

(f) converting the received radio frequency signal into dc electric current; and (g) storing the electrical current in the vicinity of the distal end of the electrically conducting pipe.

48. An apparatus for communicating with and supplying electrical energy to the distal end of an electrically conducting pipe which comprises in combination:

(a) a radio frequency generator for generating a radio frequency signal having a chosen frequency at the proximal end of the electrically conducting pipe such that the radio frequency signal remains within the electrically conducting pipe and is transmitted to the distal end thereof whereafter the radio frequency signal exits the electrically conducting pipe;

(b) data acquisition apparatus responsive to chosen input disposed in the vicinity of the distal end of the electrically conducting pipe;

(c) an antenna for reflecting a first portion of the radio frequency signal exiting the distal end of the electrically conducting pipe such that the reflected radio frequency signal reenters the electrically conducting pipe, remains therein and is transmitted to the proximal end thereof;

(d) an impedance switch in electrical connection with said antenna for modulating the electrical impedance thereof, whereby the radio frequency signal reflected by said antenna is modulated in response to data acquired by said data acquisition apparatus;

(e) a detector for receiving the reflected modulated radio frequency signal at the proximal end of the electrically conducting pipe;

(f) means for receiving a second portion of the radio frequency signal exiting the distal end of the electrically conducting pipe;

(g) a rectifier for converting the received radio frequency signal into dc electric current; and (h) means for storing the electrical current in the vicinity of the distal end of the electrically conducting pipe.

49. The apparatus as described in claim 48, wherein said means for storing the electrical current converted in the vicinity of the distal end of the electrically conducting pipe is selected from the group consisting of capacitors and batteries.

50. A method for communicating with and providing electrical energy to the distal end of an electrically conducting pipe buried in the ground, which comprises the steps of:

(a) generating an electrical signal having a chosen ultra-low or extremely low frequency in the ground in the vicinity of the proximal end of the electrically conducting pipe such that the signal penetrates the ground at least to the vicinity of the buried distal end thereof;

(b) receiving a first portion of the signal using the electrically conducting pipe as an antenna;

(c) modulating the impedance of the electrically conducting pipe in response to data received in the vicinity of the distal end of the electrically conducting pipe, whereby the first portion of the signal received by the electrically conducting pipe is modulated;

(d) detecting the modulated, received signal at the proximal end of the electrically conducting pipe;

(e) receiving a second portion of the signal;

(f) converting the received signal into dc electric current; and (g) storing the electrical current in the vicinity of the distal end of the electrically conducting pipe.

51. An apparatus for communicating with the distal end of an electrically conducting pipe buried in the ground which comprises in combination:

(a) a generator for generating a chosen ultra-low or extremely low frequency signal in the ground in the vicinity of the proximal end of the electrically conducting pipe such that the signal penetrates the ground at least to the vicinity of the buried distal end thereof, whereby the electrically conducting pipe receives a first portion of the signal;

(b) data acquisition apparatus responsive to chosen input disposed in the vicinity of the distal end of the electrically conducting pipe;

(c) an impedance switch in electrical connection with the electrically conducting pipe for modulating the electrical impedance thereof, whereby the first portion of the signal received by the electrically conducting pipe is modulated in response to data acquired by said data acquisition apparatus; and (d) a detector for receiving the modulated signal at the proximal end of the electrically conducting pipe (e) means for receiving a second portion of the signal;

(f) a rectifier for converting the received second portion of the signal into dc electric current; and (g) means for storing the electrical current in the vicinity of the distal end of the electrically conducting pipe.

52. The apparatus as described in claim 51, wherein said means for storing the electrical current converted in the vicinity of the distal end of the electrically conducting pipe is selected from the group consisting of capacitors and batteries.

* * * * *